US 8,595,935 B2

(12) United States Patent
Budinich et al.

(10) Patent No.: US 8,595,935 B2
(45) Date of Patent: Dec. 3, 2013

(54) METHOD OF LIFTING A CAB ONTO A CHASSIS

(75) Inventors: Paul William Budinich, Kirkland, WA (US); Timothy Eric Brooks, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 739 days.

(21) Appl. No.: 12/835,540

(22) Filed: Jul. 13, 2010

(65) Prior Publication Data

US 2012/0011721 A1    Jan. 19, 2012

(51) Int. Cl.
*B21D 53/88* (2006.01)
*B23Q 7/00* (2006.01)
*B23P 11/00* (2006.01)

(52) U.S. Cl.
USPC ............... 29/897.2; 29/428; 29/429; 29/430; 29/431; 29/469; 29/559

(58) Field of Classification Search
USPC ........ 29/897.2, 428, 429, 430, 431, 459, 469; 180/89.13; 296/190.01–190.11
See application file for complete search history.

(56) References Cited

U.S. PATENT DOCUMENTS

| | | | | |
|---|---|---|---|---|
| 1,893,456 | A | * | 1/1933 | Sykes et al. ..................... 29/466 |
| 3,190,688 | A | * | 6/1965 | Westrum et al. .............. 296/102 |
| 3,827,198 | A | | 8/1974 | Geihl |
| 3,889,432 | A | | 6/1975 | Geihl |
| 4,995,469 | A | * | 2/1991 | Mikkelsen et al. ......... 180/89.13 |
| 5,873,165 | A | * | 2/1999 | Bode et al. ................... 29/897.2 |
| 6,540,283 | B1 | * | 4/2003 | Johansson et al. ....... 296/190.05 |

* cited by examiner

*Primary Examiner* — Sarang Afzali
(74) *Attorney, Agent, or Firm* — Christensen O'Connor Johnson Kindness PLLC

(57) ABSTRACT

A method of mounting a vehicle cab onto a vehicle chassis is provided. The method includes providing at least one structural anchor point on an upright wall of the vehicle cab, connecting a lifting device to the structural anchor point, and using the lifting device to lift the vehicle cab and mount it on the vehicle chassis.

11 Claims, 8 Drawing Sheets

METHOD OF LIFTING A CAB ONTO A CHASSIS

BACKGROUND

The cab or sleeper section on a truck is generally hoisted into the air during the truck manufacturing process to be placed on the vehicle chassis. In current truck-building systems, the cab or sleeper section is lifted by attaching lift cables to one or more attachment points located on the floor structural beams of the cab or sleeper. The floor structural beams are not an optimal attachment point for at least two reasons: (1) under the floor is where HVAC lines, electrical bundles, exhaust pipes, and air lines are located, and such a lifting method may cause damage to these lines; and (2) lifting from the floor structural beams below the cab or sleeper center of gravity causes instability, creating a toppling hazard.

Therefore, there exists a need for an improved method for lifting a cab or sleeper onto a truck chassis.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method of mounting a vehicle cab onto a vehicle chassis is provided. The method includes providing at least one structural anchor point on an upright wall of the vehicle cab, connecting a lifting device to the structural anchor point, and using the lifting device to lift the vehicle cab and mount it on the vehicle chassis.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
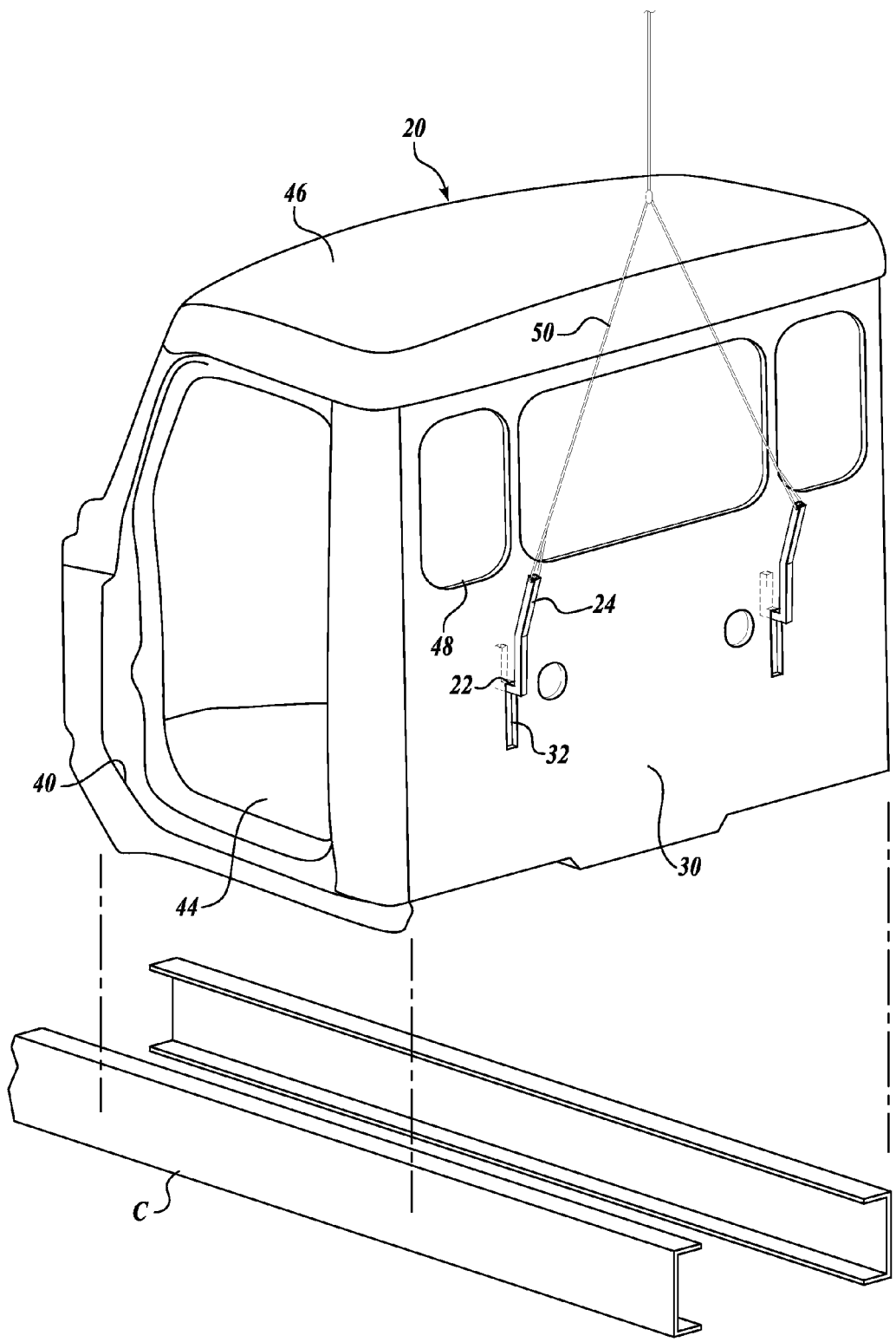
FIGS. 1 and 2 are perspective views of a vehicle cab being lifted above and mounted onto a vehicle chassis in accordance with one embodiment of the present disclosure.
Figure 2:
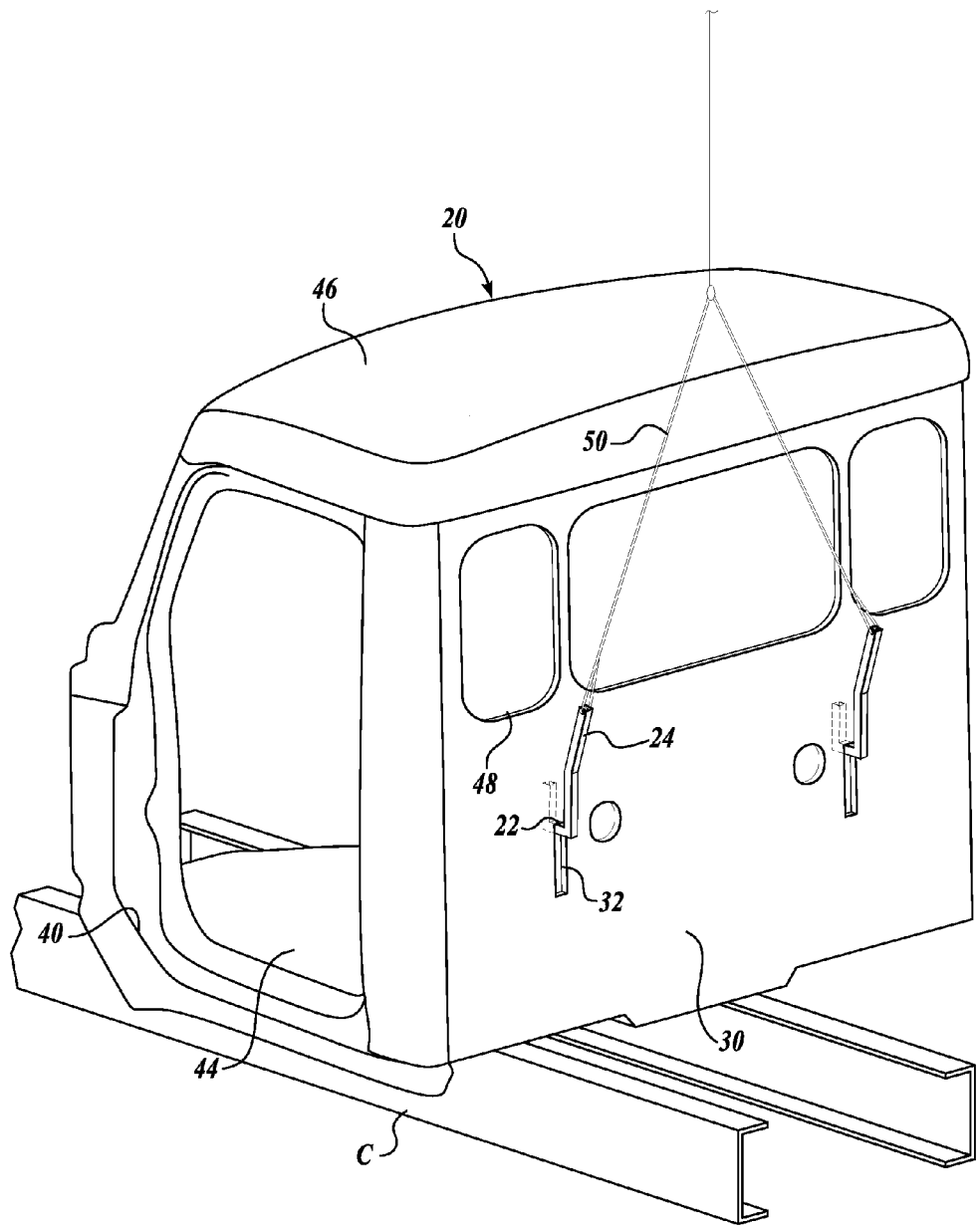

A method of mounting a vehicle cab 20 onto a vehicle chassis C in accordance with one embodiment of the present disclosure may be best understood by referring to FIGS. 1-2. The method includes providing at least one structural anchor point 22 on the vehicle cab 20, connecting a lifting device 24 to the structural anchor point 22, and using the lifting device 24 to lift the cab 20 and mount it on the vehicle chassis C. Such a mounting method provides for enhanced lifting stability, reducing operator hazards and removing the need for an operator to be under the suspended cab/sleeper to install/remove the lift cables. Moreover, such a mounting method reduces potential damage to the cab or any components thereof, such as the under-cab HVAC, exhaust pipes, air lines, or electrical lines.

Although illustrated as mounting a truck cab 20 on a truck chassis C, it should be appreciated that the methods and lifting devices described herein may also be applied to other portions of trucks, for example, sleeper sections, or other types of vehicle cabs, for example, car cabs.

As mentioned above, the method includes providing at least one structural anchor point 22 on the vehicle cab 20. In one embodiment of the present disclosure, the structural anchor point 22 is in located in an upright, substantially vertical wall of the vehicle cab 20. In the illustrated embodiment, a plurality of structural anchor points 22 are located in a rear wall 30 of the vehicle cab 20.

Most automobiles are now being designed with pressure relief valves (PRVs), which allow air to flow out of the vehicle after the cabin has been pressurized by a door slam, the HVAC system, or an airbag deployment. Cabs and sleepers on trucks are now also incorporating such PRVs. In that regard, a truck cab, for example, is designed with holes in at least one of the upright, substantially vertical walls of the cab 20. PRVs are installed into these holes to provide pressure relief out of the cab 20. The inventors have found that, prior to installation of the PRVs, the PRV holes can provide suitable structural anchor points in the vehicle cab. In other words, the PRV holes can provide suitable structural anchor points without having to alter or otherwise modify portions of the vehicle cab. Thus, when the cab/sleeper is fully assembled, the structural anchor points 22 will be covered by the installed PRVs.

As seen in the illustrated embodiment of FIGS. 1 and 2, the rear wall 30 of the cab 20 includes holes 32, which are designed and configured for PRV installation. Although shown in the rear wall 30 of the cab 20, it should be appreciated that the holes 32 may be located in other upright, substantially vertical walls of the vehicle cab 20, such as side walls 40 (see FIGS. 1) and 42 (see FIG. 5), which extend from the cab floor 44 to the cab roof 46.

Figure 5:
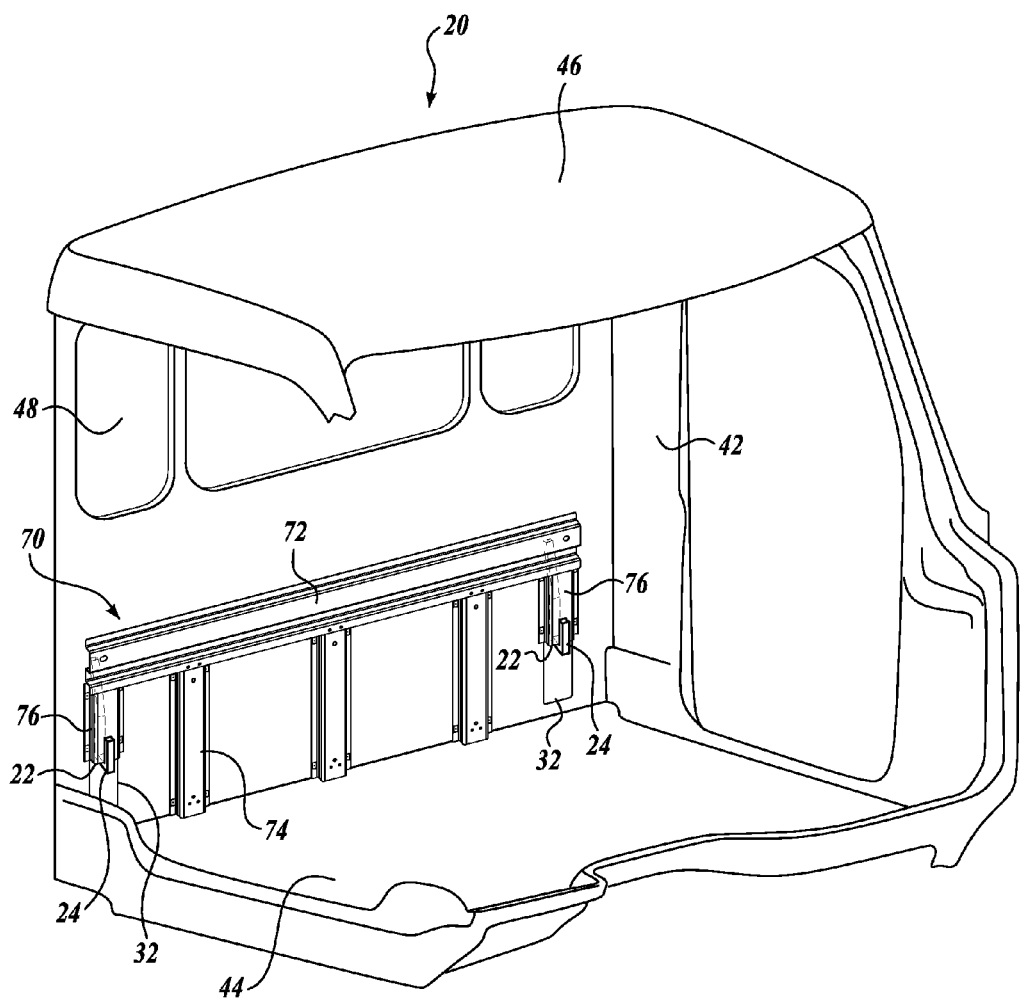
FIG. 5 is a perspective view of an internal rear wall of the vehicle cab of FIGS. 1 and 2, showing lifting devices engaged with the rear wall.
Figure 6:
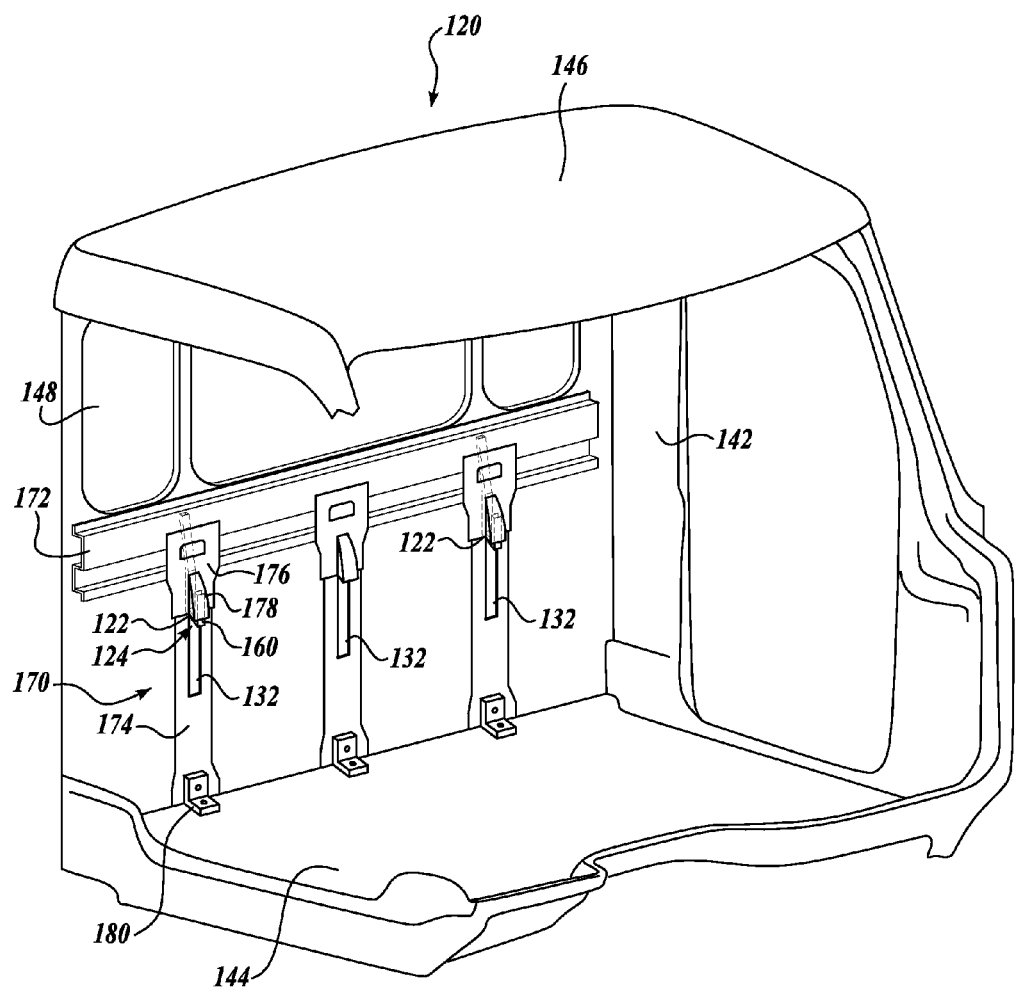
FIG. 6 is a perspective view of an alternate embodiment of an internal rear wall of the vehicle cab of FIGS. 1 and 2, showing lifting devices engaged with the rear wall.

The holes 32 are formed in a structural portion of the cab 20 to provide structural anchor points. In that regard, the cab walls are typically formed from stamped panels and/or structural extrusions, which are designed to withstand a load of about three times the total weight of a fully trimmed cab/sleeper. Referring to FIGS. 5 and 6, it should be appreciated that the PRV holes 32 and 132 may be sized and located in a variety of different orientations depending on the design of the cab (sidewall 40 broken away for clarity). In that regard, in the illustrated embodiment of FIG. 5, two PRV holes 32 are located on the rear wall 30 near the side walls 40 and 42 and near the floor 44 of the cab 20. In the illustrated embodiment of FIG. 6, three PRV holes 132 are horizontally equidistantly spaced on the rear wall 30 between the floor 44 and the windows 48 of the cab 20. It should further be appreciated that other configurations for PRV holes are also with the scope of the present disclosure, including but not limited to different locations and numbers of PRV holes.

As seen in FIGS. 5 and 6, the structural anchor points may be reinforced by reinforcing systems 70 and 170 to provide additional structural integrity to the structural anchor points 22 and PRV holes 32 as will be described in greater detail below.

In the absence of PRV holes, other suitable structural anchor points may be incorporated into the cab 20. Other suitable structural anchor points on the vehicle cab may include exterior mounting locations for aerodynamic features (such as extenders, fairings, etc.), door or window sills, or handles provided on the rear, exterior of the cab/sleeper.

The method further includes connecting a lifting device 24 to the structural anchor point 22, and using the lifting device 24 to lift the cab 20 and mount it on the vehicle chassis C. In the illustrated embodiment, the lifting device 24 may be inserted into the holes 32. Using the top perimeter portion of the holes 32 as structural anchor points 22, the lifting device 24 is connected to a lift cable 50 and an actuator (not shown), and it is used to hoist the cab 20 onto the vehicle chassis 40.

As seen in FIGS. 1 and 2, two lifting devices 24 may be attached to one or more lift cables 50 to hoist the cab 20 into the air for placement onto the vehicle chassis C. The lift cable 50 may be coupled to an actuator (not shown), such as a hydraulic lifting system, to hoist the cab 20 into the air above the vehicle chassis C (see FIG. 1) and place it on the vehicle chassis C (see FIG. 2). After the cab 20 has been hoisted onto the vehicle chassis 40, the cable 50 can be slackened, and the lift devices 24 can be removed from the holes 32. In accordance with standard truck-building processes, the cab 20 is then secured to the chassis 40, and PRVs may be installed in the holes 32.

Although shown as two lifting devices 24 in the illustrated embodiment, it should be appreciated that more than two lifting devices may be employed for use with multiple holes 32 to increase the stability of the cab 20 during lifting (see, for example, three lifting devices 124 in the illustrated embodiment of FIG. 6). It should also be appreciated that only one lifting device 24 may also be employed for use.

Figure 3:
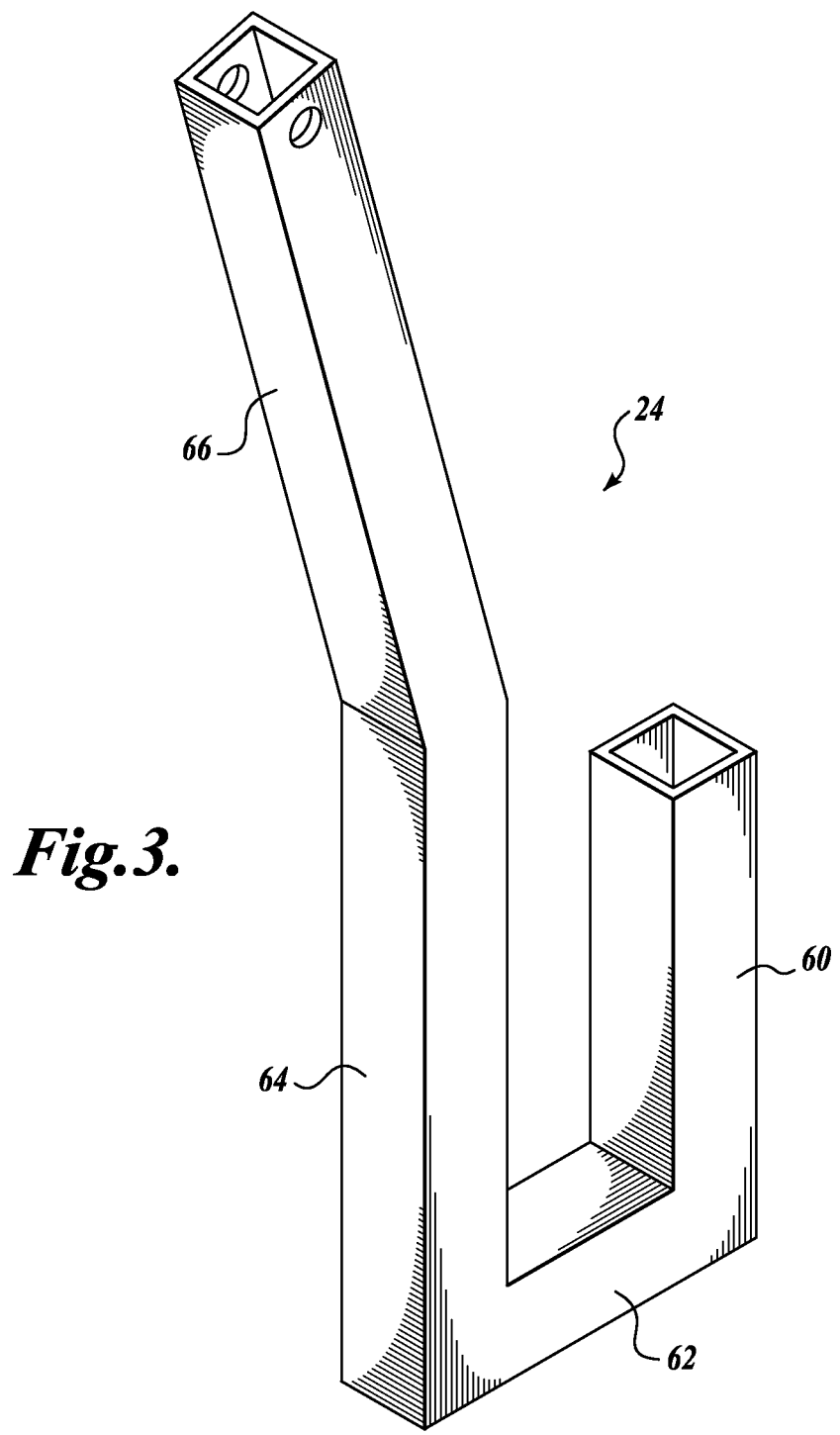
FIG. 3 is a perspective view of a lifting device used to lift the vehicle cab shown in FIGS. 1 and 2.

Referring to FIG. 3, a suitable lifting device 24 is provided in accordance with one embodiment of the present disclosure. The lifting device 24 is a J-hook configured for being insertable into a hole 32 and providing suitable lifting integrity. In the illustrated embodiment, the lifting device 24 includes first, second, and third portions 60, 62, and 64. When in an engaged orientation with a hole 32 in the cab 20, the first portion 60 is configured for passing through the hole 32. In the illustrated embodiment, the first portion 60 is a substantially vertical portion and preferably has a substantially flat surface that is designed to engage or press against the interior of the wall 30 of the cab 20 without causing damage to the cab 20.

The second portion 62 extends between first and third portions 60 and 64, and it is in a substantially horizontal position when the lifting device 24 is in its engaged orientation. The second portion 62 is configured to carry the bulk of the load of the cab 20 during lifting.

The third portion 64 includes a substantially vertical section 68 extending substantially transversely upwardly from the second portion 62 such that the third portion 64 is substantially parallel to the first portion 60. Like the first portion 60, the substantially vertical section 68 of the third portion 64 also preferably has a substantially flat surface that is designed to engage or press against the exterior of the wall 30 of the cab 20 without causing damage to the cab 20.

The third portion 64 further includes an angled section 66 extending upwardly and outwardly from the top of the substantially vertical section 68 in a direction generally away from the first portion 60. The angled section 66 is configured to be angled away from the wall 30 of the cab 20 to prevent any damage to the cab 20 by the lifting device 24 when the lifting device 24 is in its engaged orientation. The angled section 66 also aids in maneuvering the lifting device 24, such that it may be properly inserted into the hole 32 (see FIG. 4B).

The lifting device 24 may be made from any suitable material that may withstand the loads of the cab 20 when lifting the cab 20 onto the chassis C. For instance, the lifting device 24 may be made from a suitable metal, such as steel. The lifting device 24 may also be covered with a suitable non-slip material (not shown), such as rubber, that will define a non-slip surface to help prevent movement of the cab 20 relative to the lifting device 24 during lifting. Furthermore, the cover material is also preferably somewhat deformable or otherwise defines a padded surface to help prevent any scratching or other damage to the cab 20 when the lifting device 24 is engaged therewith.

It should be appreciated that any other suitable lifting device may instead be used. For example, the lifting device may include a lift pin that is mateable with the structural anchor points 22. Thus, the description provided herein should not be construed as limiting the scope of the claimed subject matter.

Figure 4A:
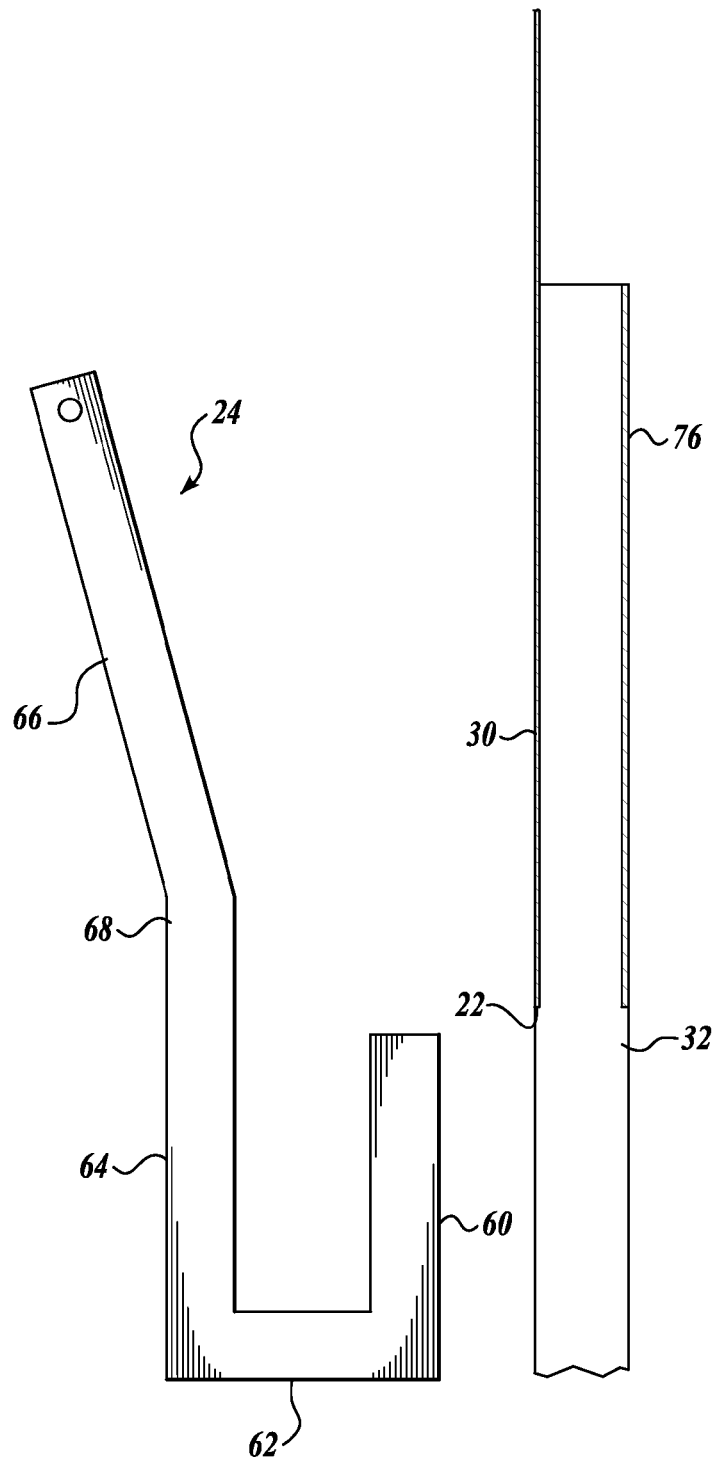
FIGS. 4A, 4B, and 4C are cross-sectional views of the lifting device showing engagement of the lifting device with a wall of the vehicle cab shown in FIGS. 1 and 2.
Figure 4B:
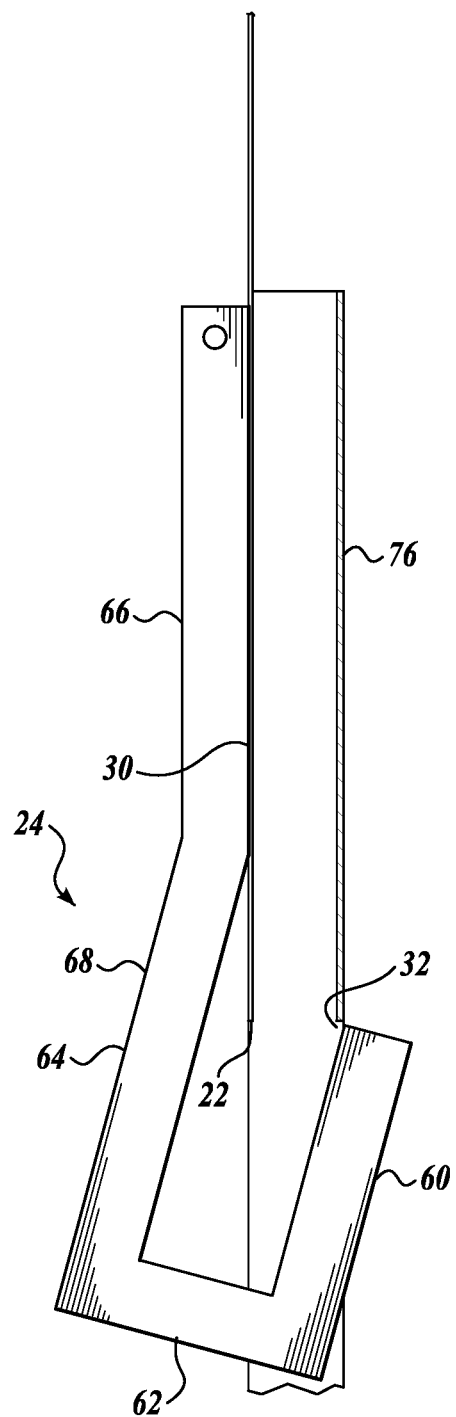
Figure 4C:
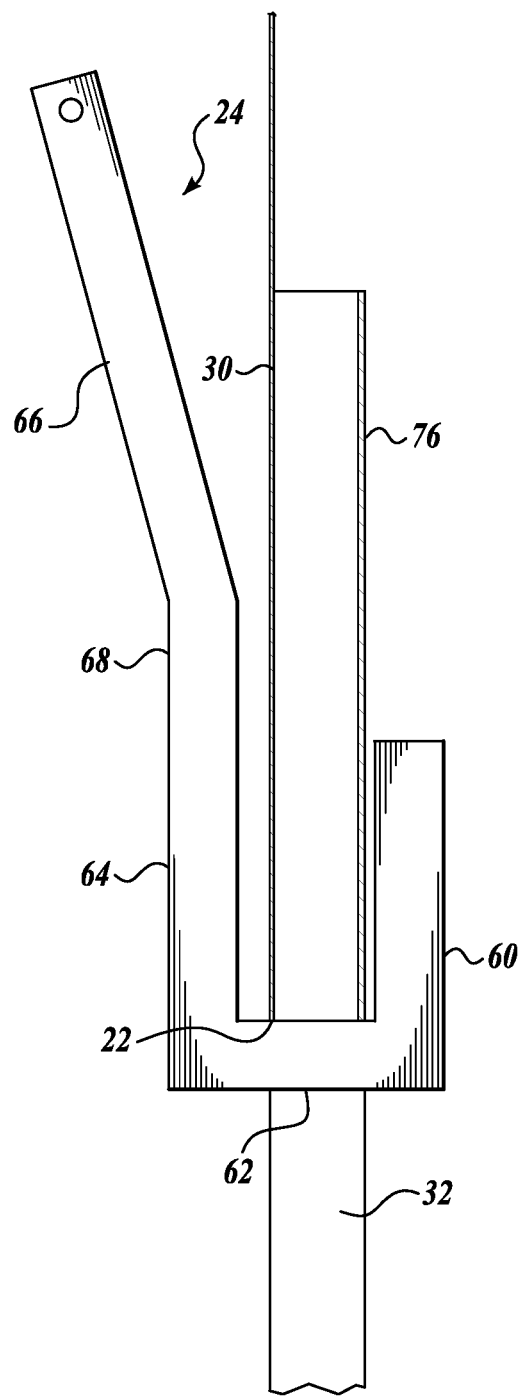

Referring to FIGS. 4A, 4B, and 4C, the method of engaging the lifting device 24 with the wall 30 of the cab 20 will now be described in detail. Referring specifically to FIG. 4A, the first portion 60 of the lifting device 24 is first positioned near the hole 32. Thereafter, the lifting device 24 may be angled toward the hole 32 to insert the first portion 60 through the hole 32. To aid in positioning the lifting device 24 relative to the hole 32, the angled section 66 of the lifting device 34 may be first abutted against or braced against the exterior of the rear wall 30 of the cab 20, as shown in FIG. 4B.

Referring to FIG. 4C, when the first portion 60 passes through the hole 32, the second portion 62 is positioned to engage the top perimeter portion of the holes 32, or the structural anchor points 22. The second portion 62 is in a substantially horizontal position when the lifting device 24 is in its engaged orientation such that the second portion 62 can carry the bulk of the load of the cab 20 during lifting. When engaged, the first and third portions 60 and 64 of the lifting device 24 are substantially parallel to the rear wall 30 of the cab 20 such that the rear wall 30 may engage and be substantially restrained between the first and third portions 60 and 64, respectively. Moreover, with a suitable material such as rubber covering the lifting device 24, the lifting device 24 is designed and configured to provide adequate lifting capabilities without damaging the rear wall 30 of the cab 20.

As mentioned above and with reference to FIGS. 5 and 6, the structural anchor points 22 may be reinforced to provide additional structural integrity to the structural anchor points 22 and the PRV holes 32. Referring to FIG. 5, one embodiment of a reinforcement system is shown. In that regard, the rear wall 30 of the cab 20 is reinforced with a system of brackets 70. A first bracket 72 extends in a substantially horizontal orientation across at least a portion of the rear wall 30 of the cab 20 about midway between the floor 44 of the cab 20 and the windows 48.

A plurality of second brackets 74 supports the first bracket 72. In that regard, the second brackets 72 are substantially vertically oriented and positioned to provide support to the wall 30 between the cab floor 44 and the first bracket 72.

A plurality of third brackets 76 are positioned on the wall 30 at or near the ends of the first bracket 72. The third brackets 76 are substantially vertically oriented and extend between the structural anchor points 22 (defined at the top perimeter of the PRV holes 32) and the first bracket 72. The third brackets 76 are secured at their upper ends to the first bracket 72 or are otherwise in engagement with the first bracket 72 such that a suitable amount of load may be transferred to from the third brackets 76 to the first bracket 72.

In the illustrated embodiment, two PRV holes 32 are located on the rear wall 30 near the side walls 40 and 42 and near the floor 44 of the cab 20 to define two structural anchor points 22. The third brackets 76 provide reinforcement between the structural anchor points 22 and the first bracket 72. In this configuration, the load of the cab 20 during lifting is transferred at least in part to the third brackets 76 (and therefore to the first bracket 72) through the lifting device 24. Moreover, the third brackets 76 may be aligned with or supported by other structural features or reinforcements in the cab 20, such as reinforcements in the cab wall or floor. In this manner, with the structural anchor points 22 aligned with the third brackets 76, further structural support may be provided to the structural anchor points 22.

It should be appreciated that the brackets 72, 74, and 76 may be formed from any suitable materials, including but not limited to metals, plastics, other materials having high structural integrity, and any combinations thereof. The brackets 72, 74, and 76 may be fastened to the wall 30 of the cab 20 by any suitable fastening means, including but not limited to fasteners, adhesives, other suitable fastening means, and any combination thereof.

Now referring to FIG. 6, a reinforcement system in accordance with another embodiment of the present disclosure will now be described in greater detail. The reinforcement system is substantially identical in materials and operation as the previously described embodiment, except for differences regarding the number and positioning of the reinforcing brackets. For clarity in the ensuing descriptions, numeral references of like elements of the cab 20 are similar, but are in the 100 series for the illustrated embodiment of FIG. 6.

As seen in reference to FIG. 6, the depicted alternate embodiment of a reinforcement system includes a system of brackets 170 secured to the rear wall 130 of the cab 120. A first bracket 172 extends in a substantially horizontal orientation across at least a portion of the rear wall 130 of the cab 120 just below the windows 148.

A plurality of second brackets 174 supports the first bracket 172. More specifically, the second brackets 172 are substantially vertically oriented on the wall 130 and positioned to provide support between the cab floor 144 and the first bracket 172. The lower ends of the second brackets 172 may be secured to the cab floor 144 with an L-bracket 180 or other suitable device.

The upper ends of the second brackets 174 may be secured to the first bracket 172 with an attachment piece 176. The attachment piece 176 may be secured to both the first and second brackets 172 and 174 by any suitable attachment means, such as with a self piercing rivet, a huck, or a standard rivet. Any other suitable attachment means may be used to ensure that a suitable amount of load may be transferred to from the second bracket 174 to the first bracket 172.

The PRV holes 132 are formed in the second brackets 174 and extend through the wall 130 of the cab 120 and define structural anchor points 122 along the top perimeter of the PRV holes 132. A hollow stop 178 may extend outwardly from the attachment piece 176 and downwardly toward the structural anchor points 122. The hollow stops 178 are sized and configured to removably receive the first portion 160 of the lifting device 124 therein when the first portion 160 is received within the PRV hole 132. When received within the stops 178, the lifting device 124 is substantially maintained in its position during the lifting process. Accordingly, the stops 178 help prevent substantial lateral movement of the lifting device 124 during the lifting process.

The stops 178 may instead be configured such that they are positioned to engage a side surface of the first portion 160 of the lifting device 124 rather than receiving the first portion 160 therein. More specifically, a stop 178 may be positioned above the structural anchor point 122 and to a side of the PRV hole 132 such that the stop 178 is engageable with a side surface of the first portion 160 of the lifting device 124. A second stop may be positioned above the structural anchor point 122 and to the other side of the PRV hole 132 to engage the opposite side surface of the first portion 160 of the lifting device 124. In this manner, the stops would be configured to help maintain the lifting devices 124 in a proper orientation during the lifting process. It should be appreciated that any other suitable design and configuration may instead be used.

Similar to the reinforcement system described above, the second brackets 174 provide reinforcement between the structural anchor points 22 and the first bracket 172. In this configuration, the load of the cab 120 during lifting is transferred at least in part to the second bracket 174, and therefore to the first bracket 172, through the lifting device 24.

Moreover, the second brackets 174 may be aligned with or supported by other structural features or reinforcements in the cab 120, such as reinforcements in the cab wall or floor. In this manner, with the structural anchor points 122 aligned with the second brackets 174, further structural support may be provided to the structural anchor points 122.

It should be appreciated that the brackets 172 and 174 may be formed from any suitable materials, including but not limited to metals, plastics, other materials having high structural integrity, and any combinations thereof. The brackets 172 and 174 may be fastened to the wall 130 of the cab 120 by any suitable fastening means, including but not limited to fasteners, adhesives, other suitable fastening means, and any combination thereof.

It should further be appreciated that any other suitable reinforcement configuration may instead be used. For instance, if the cab does not include rear windows, vertical brackets may instead extend from the cab floor to the cab ceiling, with horizontal brackets extending between the vertical brackets for support. In such a configuration, structural anchor points may be formed within the vertical brackets to maximize the structural integrity of the structural anchor points. Thus, the foregoing description should not be interpreted as limiting the scope of the claimed subject matter.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A method of mounting a vehicle cab onto a vehicle chassis, the method comprising:
   (a) providing at least one structural anchor point on an upright wall of the vehicle cab;
   (b) connecting a lifting device to the at least one structural anchor point; and
   (c) using the lifting device to lift the vehicle cab and mount it onto the vehicle chassis, wherein the at least one structural anchor point is defined by a pressure relief valve (PRV) hole and wherein connecting the lifting device includes passing a portion of the lifting device through the PRV hole such that the portion engages with a portion of the upright wall of the vehicle cab that defines the PRV hole.

2. The method of claim 1, wherein the at least one structural anchor point includes a structural reinforcement system having a plurality of structural brackets.

3. The method of claim 2, wherein at least one of the plurality of structural brackets is positioned adjacent to an upper perimeter of the PRV hole.

4. The method of claim 2, wherein the structural reinforcement system further includes a stop positioned near the PRV hole, the stop configured to selectively engage a portion of the lifting device when the lifting device is connected to the PRV hole.

5. The method of claim 1, wherein the lifting device includes first and second substantially straight vertical portions, a substantially straight horizontal portion extending between the first and second substantially straight vertical portions, and an angled section extending upwardly and outwardly from a top of the second substantially straight vertical portion.

6. The method of claim 5, further comprising passing the first substantially straight vertical portion through the PRV hole such that the substantially straight horizontal portion is engageable with the portion of the upright wall of the vehicle cab that defines the PRV hole.

7. The method of claim 1, wherein providing the at least one structural anchor point comprises providing a plurality of structural anchor points on an upright wall of the vehicle cab.

8. The method of claim 1, wherein the upright wall of the vehicle cab is a rear wall of the vehicle cab.

9. The method of claim 1, wherein the lifting device is a J-hook configuration.

10. A method of mounting a vehicle cab onto a vehicle chassis, the method comprising:

(a) providing at least one structural anchor point on an upright wall of the vehicle cab;
(b) connecting a lifting device to the at least one structural anchor point; and
(c) using the lifting device to lift the vehicle cab and mount it onto the vehicle chassis, wherein the at least one structural anchor point is defined by a pressure relief valve (PRV) hole and wherein connecting the lifting device includes passing a first portion of the lifting device through the PRV hole such that a second portion of the lifting device engages with a portion of the upright wall of the vehicle cab that defines the PRV hole.

11. The method of claim 10, wherein the lifting device includes first and second substantially straight vertical portions, a substantially straight horizontal portion extending between the first and second substantially straight vertical portions, and an angled section extending upwardly and outwardly from a top of the second substantially straight vertical portion and wherein the first portion of the lifting device passing through the PRV hole is the first substantially straight vertical portion and the second portion of the lifting device engaging with the portion of the upright wall is the substantially straight horizontal portion.

* * * * *